Aug. 14, 1934.  A. E. WILKOFF  1,970,211
BRAKE TESTING APPARATUS
Filed Aug. 8, 1930
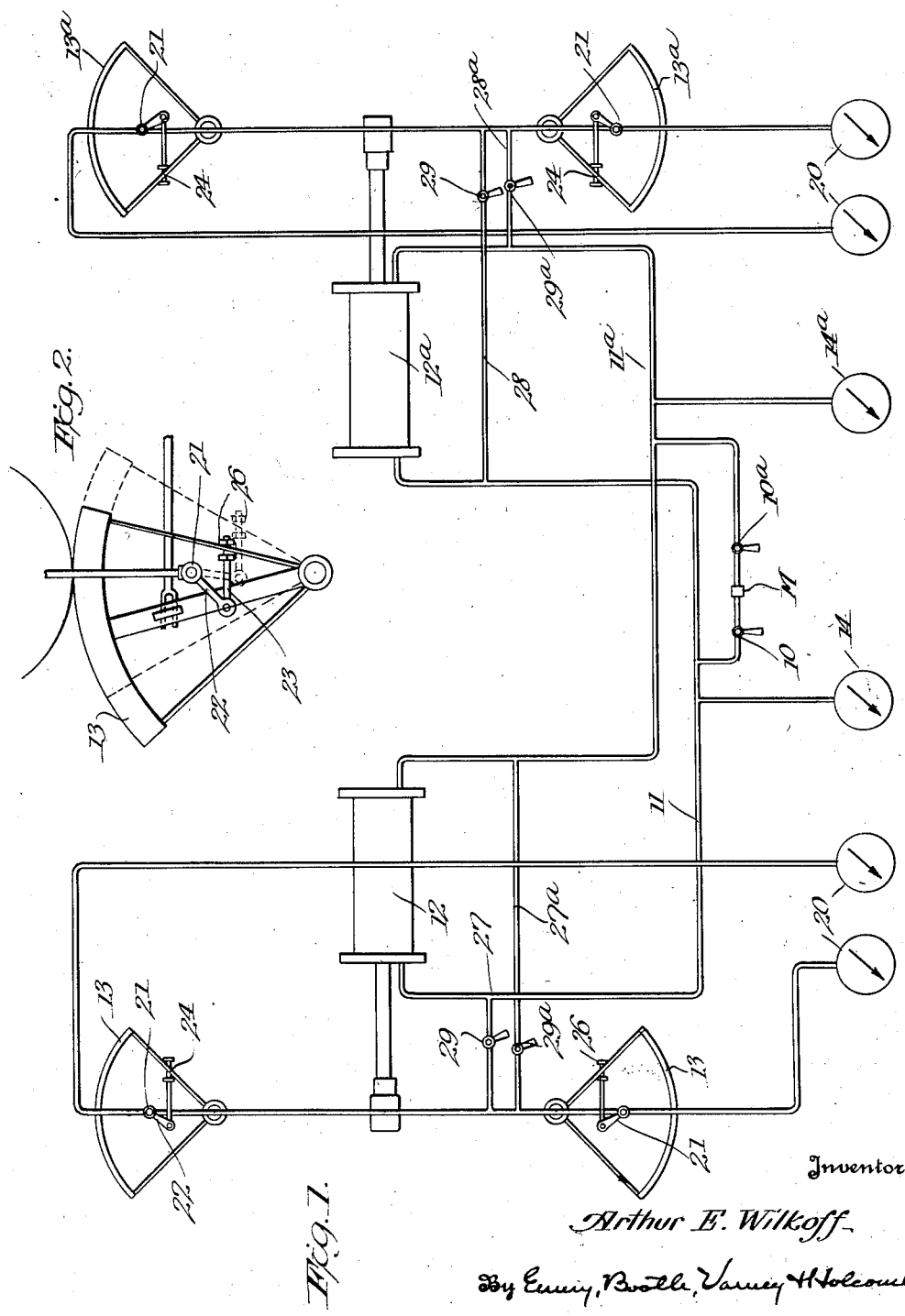

Patented Aug. 14, 1934

UNITED STATES PATENT OFFICE 1,970,211

BRAKE TESTING APPARATUS

Arthur E. Wilkoff, Niles, Ohio, assignor to Youngstown Steel Car Corporation, a corporation of Ohio Application August 8, 1930, Serial No. 473,968

10 Claims. (Cl. 265—47)

The present invention relates to mechanism adapted to test and measure the resistance offered by the brakes of motor vehicle wheels so that they may be readily adjusted and equalized. The invention has for its principal object the improvement of existing brake testing machines by providing improved means for indicating the power required to turn the wheel against the resistance of its brake.

In testing the wheel brakes of motor vehicles it is customary to roll the vehicle upon the testing stand until each of its wheels rests upon and is supported by wheel-supporting members adapted to be moved by power to rotate the wheel against the resistance of its set brake with means for measuring the power applied to the wheel supporting members. The wheel supports may be horizontally slidable platforms as shown and described in my copending application Serial No. 459,550, or may be pivoted rockers as disclosed and described in my copending application Serial No. 462,071, and advantageously the wheel supporting members may be conveniently moved by fluid pressure as disclosed in both of my copending applications, although other types of testers are readily adaptable to my invention.

To this end my present invention aims to improve existing brake testers, generally, and specifically, to improve brake testers of the fluid pressure operated type as disclosed in my said copending application, by providing indicating means for measuring the power required to move the wheels against the brake and to maintain such indications throughout the testing of all brakes, so that the operator may conveniently determine the differences in pressure and power required to move each wheel.

Illustrative of one embodiment of the invention reference may be had to the accompanying drawing wherein Fig. 1 is a diagrammatic view of one embodiment of the invention adapted to a brake tester employing fluid pressure operated means for moving pivoted wheel-supporting rockers; and Fig. 2 is an enlarged detail view of the invention as applied to one rocker.

Heretofore in the testing of vehicle brakes by testing machines of the fluid pressure operated type, as disclosed in my said copending applications, it was necessary for the operator to admit fluid pressure to the operating cylinders gradually and then observing visually which wheel moved first, note quickly on the gauge the pressure at which the wheel moved. For example, referring to Fig. 1, in the operation of prior testers of this type the operator when testing the brakes for forward drive, opened the valve 10, gradually permitting air from the main line M to build up in line 11 and the forward end of cylinders 12 and 12ª for both the forward and rear wheel supports 13 and 13ª which are usually connected together by suitable means for simultaneous operation. As the pressure was gradually increased as indicated by a master gauge 14, the operator carefully observed the wheel to first move, which obviously was the wheel having the weakest brake. This movement of the wheel and consequent movement of the wheel support increased the capacity of the respective air lines and the proper pressure was noticeable by a slight dropping in pressure on the gauge. The operation was continued until all brakes were tested, and then if desired, the other valve 10ª was opened to admit air simultaneously into the opposite ends of the cylinders 12 and 12ª to move the wheel supports in reverse direction to test the brakes for reverse or backward movement of the wheels, and the pressure indicated on gauge 14ª.

My present invention aims to improve the operating means and indicating means so that the pressure or power required to move each wheel against its brake will be indicated on a separate gauge, and that pressure indication maintained through the entire testing of all wheel brakes, so that errors due to failure of the operator to note the wheel first to move, or to remember at what pressure it moved, will be eliminated.

Accordingly, as shown in Fig. 1, wherein the wheel supporting members may be in the form of pivoted rockers as disclosed in my copending application, Serial No. 462,071, a separate gauge 20 is advantageously provided for each rocker or wheel support 13 and 13ª which may be appropriately marked to indicate a corresponding wheel support, i. e. L—Front, R—Front, L—Rear, R—Rear. Each of these gauge may be connected with valves 21 suitably mounted on the frame of the tester in fixed position adjacent the rockers or wheel supports 13 or 13ª, and provided with operating handles 22 to which are connected links 23 having a suitable lost motion connection 24 with the rockers 13 or 13ª. For example, the links 23 may loosely slide through openings in the rockers 13 or 13ª and carry nuts or stops 26 on each side of the frame portion of the rocker so that a definite and predetermined movement of the rocker will be required before operation of the valves.

Preferably the valves for each pair of rockers, that is, the forward pair and the rear pair, are supplied from common lines 27 and 28 which may be connectd respectively to the air supply lines leading to opposite ends of the cylinders 12 and 12ª, so that each pair of brakes may be tested during movement of the pistons in cylinders 12 and 12ª in one direction, and by means of the pipes 27ª and 28ª each pair may be tested during movement in the opposite direction, valves 29 being provided for connecting one or the other of the air lines 11 or 11ª to the common lines leading to the valves 21 and gauges 20.

In practice, as the vehicle is rolled upon the testing stand with its wheels supported by the rockers, the forward movement of the vehicle will move the rockers 13 and 13ª to their forward position as shown in Fig. 2. In this position one of the nuts 26 will have engaged the frame of its rocker 13 or 13ª and moved the valve to its full opened position. Now the operator opens valve 10 to admit air into line 11 and to the forward or left hand end of the cylinders 12 and 12ª (as viewed in Fig. 1) which, acting through the means connecting the rockers together, will move them rearwardly in unison, the air pressure in said line being indicated in the gauges 14 and 20. When the rocker has moved through a predetermined distance to rotate the wheel sufficiently to determine brake resistance (preferably about three fourths of its stroke) the frame of the rocker engages the opposite stop 26 and operates link 25 to swing valve handle 24 to close valve 21 and drop the air in the line between the valve 21 and its gauge 20, so that the reading on the gauge will be maintained. When all four gauges are connected to a single line as at 11, each gauge 20 will show the pressure required to move its respective wheel and this air being trapped between the valves 21 and gauges 20, the readings on the gauges will be maintained until the operator can leisurely make notation and complete his records.

It is obvious that my invention is not restricted to the use of the particular type of brake tester apparatus diagrammatically illustrated herein, as various types and constructions of wheel supports and means for moving them are readily adaptable to the purposes of the invention, as disclosed in my copending applications.

I claim:

1. In a brake testing machine, in combination, a movable wheel supporting member for supporting the wheel of a vehicle, fluid pressure operated means for moving the wheel supporting members to turn the wheel against the resistance of its brake, a gauge for indicating the fluid pressure required to move said wheel against the resistance of its brake, and valve means operative upon a predetermined movement of said wheel supporting members for maintaining the indicated pressure in said gauge.

2. In a brake testing machine, in combination, a movable wheel supporting member for supporting the wheel of a vehicle, fluid pressure operated means for moving the wheel supporting members to turn the wheel against the resistance of its brake, a gauge for indicating the fluid pressure required to move said wheel against the resistance of its brake, and valve means controlled by the movement of said wheel support for maintaining the indicated pressure on said gauge after completion of movement of said supporting member.

3. In a brake testing machine, in combination, a movable wheel supporting member for supporting the wheel of a vehicle, fluid pressure operated means for moving the wheel supporting member to turn the wheel against the resistance of its brake, a gauge for indicating the fluid pressure required to move said wheel against the resistance of its brake, and means operative upon predetermined movement of said wheel supporting member for maintaining the indicated pressure on said gauge and means to reset said fluid pressure means and gauge.

4. In a brake testing machine, in combination, a movable wheel supporting member for supporting the wheel of a vehicle, fluid pressure operated means for moving the wheel supporting member to turn the wheel against the resistance of its brake, means for indicating the fluid pressure required to rotate a wheel and means operable after a predetermined movement of said wheel support for preventing further indication on said gauge.

5. In a vehicle brake testing machine in combination with a plurality of movable wheel supporting members, one for each vehicle wheel, and means for applying moving force to said members in unison to turn each wheel against the resistance of its brake, of means for indicating the force applied to each supporting member, and means effective upon a predetermined movement of each supporting member, for maintaining the indication on its indicating means for future reference irrespective of further movement of the other wheel supports.

6. A brake testing machine as defined in claim 5 characterized by the means for moving the wheel supporting members being fluid pressure operated and the indicating means comprising a fluid pressure gauge connected in line with said moving means.

7. In a brake testing machine a plurality of movable wheel supports, one for each brake wheel for supporting and turning each wheel against the resistance of its brake, power means for applying a moving force to said supports in unison, gauge means for indicating the maximum power required for moving each wheel support and means for preventing a reading on said gauge means in excess of the power required to move any one wheel support irrespective of the power required to move the other support.

8. In a brake testing device a movable wheel support, a fluid pressure cylinder and piston device connected thereto, a gauge connected to said cylinder for indicating the fluid pressure in said cylinder during movement of the wheel support and piston, and means effective upon a predetermined movement of said wheel support for locking the gauge against further indication, whereby the reading on said gauge may be maintained for future reference at the convenience of the operator.

9. In a brake testing device, a movable wheel support, a fluid pressure cylinder and piston device connected thereto, a gauge connected to said cylinder for indicating the fluid pressure in said cylinder during movement of the wheel support and piston, and means controlled by the movement of said wheel support for locking the gauge against further indication, whereby the reading on said gauge may be maintained for further reference at the convenience of the operator.

10. In a brake testing device, a movable wheel support, a fluid pressure cylinder and piston device connected thereto, a gauge connected to said cylinder for indicating the fluid pressure in said cylinder during movement of the wheel support and piston, and valve means operable by movement of the wheel support for closing the fluid pressure line to said gauge and trapping the fluid under pressure therein whereby to maintain the reading on said gauge for future reference at the convenience of the operator.

ARTHUR E. WILKOFF.